United States Patent [19]

Mann

[11] Patent Number: 5,516,857
[45] Date of Patent: May 14, 1996

[54] THERMOPLASTIC URETHANE ELASTOMERIC ALLOYS

[75] Inventor: William H. Mann, Hopkinton, N.H.

[73] Assignee: REFAC International, Ltd., New York, N.Y.

[21] Appl. No.: 474,095

[22] Filed: Jun. 7, 1995

Related U.S. Application Data

[63] Continuation of Ser. No. 82,749, Jun. 25, 1993, abandoned.

[51] Int. Cl.$^6$ .................. C08L 75/04; C08L 77/00; C08L 67/00; C08L 27/06
[52] U.S. Cl. .................. 525/458; 525/457; 525/129; 525/130; 525/424; 525/440
[58] Field of Search .................. 525/457, 458, 525/129, 130, 424, 440

[56] References Cited

U.S. PATENT DOCUMENTS 4,608,418  8/1986  Czerwinski et al. .................. 521/130
5,155,180  10/1992  Takada et al. .................. 525/440

OTHER PUBLICATIONS

Hawley's Condensed Chemical Dictionary, Twelfth Ed., Van Nostrand Reinhold Co., New York (1993). p. 934.

*Primary Examiner*—Thomas Hamilton, III
*Attorney, Agent, or Firm*—Wyatt, Gerber, Burke & Badie

[57] ABSTRACT

Thermoplastic urethane elastomeric alloys are obtained by melt compounding at least one first component that is a polyurethane elastomer having at least one plasticizer reacted therein, this first component being formed by heating a reaction mixture comprising at least one isocyanate having a functionality of less than about 2.2, at least one long chain polyol, at least one chain extender and at least one plasticizer in specified amounts at a temperature of at least about 330° F. (165.6° C.), with at least one second component that is another thermoplastic elastomer not within the definition of the first component.

12 Claims, No Drawings

1

THERMOPLASTIC URETHANE ELASTOMERIC ALLOYS

This application is a continuation of Ser. No. 08/082,749, filed on Jun. 25, 1993, now abandoned.

BACKGROUND OF THE INVENTION

The present invention relates to thermoplastic urethane elastomeric alloys containing as a first component at least one polyurethane elastomer and as a second composition at least one thermoplastic elastomer that is not within the definition of the first component.

Silicone has been used medically in various applications, e.g., pumps, but has been found to have a number of undesirable properties such as poor abrasion resistance which results in particles flaking off and, in the case of medical applications, accumulating in one or another organ in the body, low tensile strength, poor flex fatigue, and poor barrier properties. Styrene-butadiene elastomers have been evaluated as substitutes for silicone and are inexpensive and processable but lack excellent tear resistance and tensile strength. There is a need for materials that overcome the disadvantages of silicone.

U.S. Pat. No. 4,608,418 to Czerwinski et al. teaches hot melt urethane compositions formed from a mixture of one or more polyisocyanates, one or more hydroxyl terminated polyols, one or more chain extenders and one or more plasticizers. A hot melt composition generally is one applied in the molten state, at temperatures of about 250°–450° F. (121.1°–232.2° C.), and having a viscosity in that condition (Brookfield viscometer) of less than about 50,000 cps, preferably less than about 25,000 cps. When cooled to room temperature, such compositions are solids that are elastomeric in nature. These compositions are formed by heating the reactants at temperatures of at least about 330° F. (165.6° C.), preferably at about 350° F. to about 450° F. (176.7°–232.2° C.) for 2 or 3 hours. The compositions of this patent have been found to be an excellent first material for use in the present invention. The disclosure of the 4,608,418 patent is hereby incorporated by reference.

OBJECTS OF THE INVENTION

It is an object of the present invention to provide compositions having properties that are superior to those of silicones, rubbers and other elastomeric materials. Another object is to provide compositions having excellent memory, excellent compression set at both room temperature and body temperature, high tensile strength, excellent tear resistance, excellent softness, warm "feel" low modulus (which means easy to stretch and conforming to body parts and their movements), long flexural life, dimensional stability and thermoplastic processability. A further object is to provide compositions having preselected speed of recovery, or "snap" after deformation. Yet another object is to provide methods for preparing these compositions. These and other objects of the present invention will be apparent from the following description.

SUMMARY OF THE INVENTION

The first component of the compositions of the present invention is formed from a mixture of one or more polyisocyanates, one or more hydroxyl terminated long chain polyols, one or more chain extenders, and one or more plasticizers. The first component is formed by blending its constituent ingredients and heating the blended mixture at about 330° F. (165.6° C.) to about 450° F. (232.2° C.) for 2 or 3 hours. The second component of the compositions of the present invention is a thermoplastic composition, preferably a second thermoplastic polyurethane composition, not within the definition of the first component. Examples of suitable second component compositions are a polyurethane not within the definition of the first component, a polyamide, a polyester, a polyether blocked amide, a copolymer of ethylene and vinyl acetate, a copolymer of ethylene and acrylic acid or methacrylic acid, or a polymer of vinyl chloride. More than one species of each component may be present.

DETAILED DESCRIPTION

The first component of the urethane compositions of the present invention is, as indicated in U.S. Pat. No. 4,608,418, a thermoplastic hot melt composition comprising a polyurethane having at least one plasticizer reacted therein formed by heating a reaction mixture comprising at least one isocyanate having a functionality less than about 2.2, at least one hydroxyl terminated long chain polyol, at least one chain extender and at least one plasticizer at a temperature of at least about 330° F., wherein said components are present in amounts that are within the values of the following formula:

$$\frac{A+B+C}{D} = 0.5 \text{ to about } 7.0$$

wherein A represents the equivalent weight of the long chain polyol x the moles thereof used; B represents the equivalent weight of the chain extender x the moles thereof used; C represents the equivalent weight of the isocyanate used; and D represents the grams of plasticizer.

The process for preparing the first component of the urethane compositions of the present invention generally is, as disclosed in U.S. Pat. No. 4,608,418, to heat a polyurethane formed from a mixture of at least one isocyanate having a functionality less than about 2.2, at least one long chain polyol, at least one chain extender and at least one plasticizer at a temperature of at least about 330° F., wherein said components are present in an amount to meet the foregoing formula. The urethane material of the first component is based on essentially stoichiometric amounts of a diisocyanate (which insures that a thermoplastic material results) having a functionality of 2.2 or less, preferably 2.15 or less and most preferably in the range of 2.0–2.1. If the functionality is in excess of 2.2, or with certain isocyanates such as MDI and HMDI close to 2.2, a thermosetting material results. Preferably the NCO/OH ratio in the reaction system is about 0.95 to about 1.05 as at values substantially in excess of 1.05 the reaction product tends to be non-thermoplastic. Chain extending agents, compounds which carry at least two active hydrogen atoms per molecule and preferably have a molecular weight of from about 52 to below 500, most preferably from about 62 to about 250, are included in the reaction mixture. These compounds react with the isocyanate groups of the prepolymer to produce high molecular weight polyurethanes and polyurethane ureas by linking several isocyanate prepolymer. Plasticizers are also included in the reaction mixture. The plasticizer must be capable of being reacted into the polyurethane at temperatures of about 330° F. (165.6° C.).

In accordance with a preferred process of forming the first component of the compositions of the present invention, the ingredients thereof are blended at the lowest possible temperature, the system is permitted to exotherm and, after the peak exotherm has been reached, the system is heated at about 330° F. to about 450° F. while agitating to complete the reaction. The reaction of the one or more plasticizers into the system is substantially completed simultaneously with attainment of the requisite temperature of at least about 330° F (165.6° C.). Based on experience to date, the plasticizer cannot be extracted therefrom or is only partially extractable by common organic solvents, e.g., hexane, gasoline, motor oil, and the like, at normal end use conditions for the first component absent the second component. It is also possible, however, to simply blend all of the components, permit the blend to cure in situ, and then, prior to or during use, elevate the temperature to at least about 330° F. Heating time varies greatly depending upon the form of the composition. For example, assuming a substantially completely cured thin film or layer thereof (that is, one that has been permitted to cure in situ in place or in a container for a substantial period of time), results indicate that heating to at least about 330° F. (165.6° C.) for at least about two hours to form the resultant hot melt composition.

The second component of the compositions of the present invention is a thermoplastic elastomer composition and can be another urethane not within the definition of the first component, a polyamide, a polyester, a polyether blocked amide, a copolymer of etheylene with vinyl acetate, a copolymer of ethylene and acrylic acid or methacrylic acid, or a polymer of vinyl chloride.

Preferred polyisocyanate compounds for the first component and for the second component as well if it is a urethane are 4,4'-diphenyl methane diisocyanate hereafter termed MDI, and 4,4'-methylene-bis(cyclohexylisocyanate) hereafter termed HMDI, and isocyanates of the formula O=C=N—[D]—N=C=O where D is an aliphatic group of from 6 to 36 carbon atoms. Suitable long chain polyols are polyester polyols, polycaprolactone polyols, polyether polyols, or polycarbonate polyols.

The chain extending compounds are straight or branched chain aliphatic dihydroxy compounds of from 2 to about 10 carbon atoms, e.g., ethylene glycol, 1,3-propanediol, 2-methyl- 1,3-propanediol, 1,4-butanediol, 1,5-pentanediol, 2-methyl- 1,4-butanediol, 1,6-hexanediol, and 1,10-decanediol. A preferred chain extender is 1,4-butanediol.

Suitable plasticizers are, for example, butyl benzyl phthalate, dibutyl phthalate, dioctyl phthalate, and dipropylene glycol dibenzoate. A preferred plasticizer is butyl benzyl phthalate.

Compositions made in accordance with the teachings of U.S. Pat. No. 4,608,418 can, of course, be used as the first component of the compositions of the present invention. Examples of such compositions include the following:

Lambda™ C100-55, Lambda™ C101-35, Lambda™ C103-46, Lambda™ C200-65, Lambda™ C201-57, Lambda™ C210-50D, Lambda™ C301-75, Lambda™ C3300-80, Lambda™ C3300-85, Lambda™ L104-40 and Lambda™ L3300-90. Lambda is a trademark of Genesco. Lambda C101-35 is a thermoplastic MDI-based, polyester urethane elastomer formed with a long chain ethylene adipate polyester diol having an average molecular weight (m.w.) of 1000 and hydroxyl number of 55. Lambda™ C100-55, Lambda™ C103-46, Lambda™ C200-65, Lambda™ C201-57, Lambda™ C210-50D and Lambda™ C301-75 are MDI-based polycaprolactone urethane elastomers, and L104-40 is an HMDI-based long chain polycaprolactone diol with an average m.w. of 3000 and hydroxyl number of 37.4. Lambda™ L3300-80, Lambda™ L3300-85 and Lambda™ L3300-90 are HMDI-based polyether urethane elastomers.

Commercially available urethane compositions that are usable as the second component of the compositions of the present invention include the following:

TEXIN (Miles) thermoplastic polyurethane polyesters 480A, 591A, 688A, 345D, 355D, 445D, 455D, 458D, 5187; TEXIN (Miles) polyurethane polyethers 985A, 990A, and 970D; TEXIN (Miles) thermoplastic polyurethanes 5187, 5286, 5265 and 5370; ESTANE (B.F. Goodrich) polyester-based polyurethanes 58144, 58271, 58277, 58300, 58887, and 58863; and PELLETHANE (Dow) polyester polycaprolactone elastomer 2102; polytetramethylene glycol ether 2103; polyester polycaprolactone 2354, automotive grades; polyester polyadipate 2355; and polytetramethylene glycol ether 2363, health care applications, thermoplastic 455 (Morton).

Examples of non-urethane thermoplastic compositions usable as the second componnent of the compositions of the present invention include the following:

(a) polyamide resins, e.g., Versamid 930 and Henkel Macromelt 6238 (Henkel);

(b) polyester resins, e.g., Hytrel 5556, 6356, 8238, and Emser 1G (DuPont);

(c) polyether block amides, e.g., Pebax resins 2533, 3533, and 4033 (Atochem);

(d) copolymers of ethylene and (1) vinyl acetate, e.g., DuPont Elavax resins such as 265 and 205-W, and DuPont Hy-Elvaloy resins 965 and HP-441, or (2) methacrylic acid, e.g., DuPont Nucryl resins; or (e) polyvinyl chloride, e.g., Fleximer resins such as or Geon 83741 (B.F. Goodrich).

The compositions of the present invention are prepared by mixing and melt alloying or melt compounding at least one first component as defined herein at least one second thermoplastic elastomer not within the definition of the first component. The melt alloying or melt blending can be carried out in any conventional plastic and/or rubber processing equipment, e.g., extruder, continuous mixer, or banbury process equipment. The ranges of the two components can vary from 5–95% wt. % of one to 95–5 wt. % of the other, preferably from 15–85 wt. % of one to 85–15 wt. % of the other, more preferably from about 20–80 wt. % of one to about 80–20 wt. % of the other, and most preferably from about 30–70 wt. % of one to about 70–30 wt. % of the other.

End products made from the compositions of the present invention have outstanding properties:

1) Compression set performance—in their functional temperature range of from room temperature to body temperature, compression set is between 15–20 as determined by ASTM D395-61.

2) Recovery performance—where performance measurement was the amount of drug delivered from the first deflection to the last, after over 1,000,000 consecutive deflections, the diaphragm of a peristaltic pump delivered the same amount of drug after the last deflection as after the first. Gaskets are better than silicone in holding a negative pressure and in air barrier properties.

3) Elastic properties—these products have outstanding elastic properties of recovery and snap back. After repeated elongation, 5 cycles, to 200%, 250% and 300% elongation, the composition of example 1 shows 100% recovery at 200% and 250% elongation and 95–100% recovery at 300% elongation.

4) Low modulus—while having excellent recovery, elastic compression set properties, the products have a low modulus compared to other elastomers, especially other urethanes. That is, they are very easy to stretch and are very comfortable in accommodating to body movements.

5) Blood contact—the products pass USP Class VI blood contact test; they do not kill blood cells.

6) Tear resistance—outstanding for such a soft material.

7) Puncture resistance—outstanding for such a soft material.

8) Abrasion resistance—outstanding for such a soft material. sodium hydroxide.

The following examples illustrate the present invention without, however, limiting the same thereto.

EXAMPLE 1

Materials: TEXIN 480A—thermoplastic MDI based, aromatic ester urethane elastomer (Miles)

Lambda™ C101-35—thermoplastic MDI based, aromatic ester urethane elastomer formed with long chain ethylene adipate polyester diol having average m.w. of 1000 and hydroxyl number of 55 (Genesco)

Two parts by weight of Texin 480A and one part by weight of C101-35 were melt blended at temperatures between about 250° F. and 425° F. (121.1°–232.2° C.), preferably between about 250° F. and 390° F. (121° C.–199° C.). The material was then cooled and formed into particles for further processing as a thermoplastic elastomeric material into the desired device, shape or configuration by, e.g. injection molding, extrusion and the like. The extruder temperature profile was: extruder throat, water cooled 60°–80° F. (15.6°–26.7° C.), zones 1 and 2, 385° F. (196.1° C.), zone 3, 365° F. (185.0° C.) and zone 4 360° F. (182.2° C.), adapter, 330° F. (165.6° C.), and die 330° F. (165.6° C.). The products had outstanding abrasion resistance, tensile strength, puncture resistance and general toughness, and yet a low softness, 50 Shore A. In addition they had a lower than anticipated modulus, that is to say, they were easily deformed where other materials were difficult to deform and hence unacceptable in applications requiring deformation. The products also had outstanding recovery properties after deformation, namely, 100% recovery when elongated 200–250% or less. The products also had an unexpectedly short time period for recovery of physical properties, i.e., the physical properties had returned to about 80–85% of their maximum ten hours after injection molding. In the case of conventional urethanes, about 48 hours are permitted to elapse before testing.

EXAMPLE 2

Materials: TEXIN 480A—thermoplastic MDI based, aromatic ester urethane elastomer (Miles)

Lambda™ C101-35—thermoplastic MDI based, aromatic ester urethane elastomer (Genesco)

One part by weight of Texin 480A and three parts by weight of C101-35 were treated to the substantially same conditions as described in example 1 with similar results being obtained.

EXAMPLE 3

Materials: ESTANE 58300—thermoplastic MDI based, aromatic ester urethane elastomer (Goodrich)

Lambda™ C100-55—thermoplastic MDI based, aromatic ester urethane elastomer (Genesco)

One part by weight of ESTANE 58300 and two parts by weight of C100-55 were treated to the substantially same conditions as described in example 1 with similar results being obtained.

EXAMPLE 4

Materials: ESTANE 58277—thermoplastic MDI based, aromatic ester urethane elastomer (Goodrich)

Lambda™ C103-45—thermoplastic MDI based, aromatic ester urethane elastomer (Genesco)

One part by weight of 58277 and two parts by weight of C103-45 were treated to the substantially same conditions as described in example 1 with similar results being obtained.

EXAMPLE 5

Materials: Pebax 2533—thermoplastic MDI based, aromatic ester urethane elastomer (Atochem)

Lambda™ C200-65—thermoplastic MDI based, aromatic ester urethane elastomer (Genesco)

One part by weight of Pebax 2533 and two parts by weight of C200-65 were treated to the substantially same conditions as described in example 1 with similar results being obtained.

EXAMPLE 6

Materials: TEXIN 480A—thermoplastic MDI based, aromatic ester urethane elastomer (Miles)

Lambda™ C103-45—thermoplastic MDI based, aromatic ester urethane elastomer (Genesco)

One part by weight of Texin 480A and two parts by weight of C103-45 were treated to the substantially same conditions as described in example 1 with similar results being obtained.

EXAMPLES 7–12

Following the procedures described herein, additional compositions of the present invention are prepared from the following materials:

7. Versamid 930—thermoplastic polyamide resin (Henkel), one part by weight

Lambda™ L104-40—HMDI-based long chain polycaprolactone diol (Genesco), one part by weight 8. Hytrel 5556—polyester resin (DuPont), three parts by weight Lambda™ L3300-80-HMDI-based polyether urethane elastomer, two parts by weight 9. Elavax 265—vinyl acetate resin (DuPont), three parts by weight Lambda™ C301-75-MDI-based polycaprolactone urethane elastomer, one part by weight 10. Geon 83741—polyvinyl chloride polymer (B.F. Goodrich), two parts by weight Lambda™ C100-55—thermoplastic MDI based, aromatic ester urethane elastomer, three parts by weight 11. TEXIN 985A—polyurethane polyethers (Miles), seven, parts by weight Lambda™ C103-45—thermoplastic MDI based, aromatic ester urethane elastomer, three parts by weight Although specific features of the invention are included in some embodiment and not others, it should be noted that each feature may be combined with any or all of the other features in accordance with the invention.

In addition, it should be noted that the invention is not intended to be limited to- the specific materials and construction described herein.

It should be understood that the foregoing description of the invention is intended to be merely illustrative thereof, that the illustrative embodiments are presented by way of example only, and that other modifications, embodiments, and equivalents may be apparent to those skilled in the art without departing from its spirit.

Having thus described the invention, what we desire to claim and secure by Letters Patent is:

1. A composition containing:

(a) from 5–95 wt. % of a first component of at least one first thermoplastic hot melt composition formed by heating to a temperature of at least about 330° F. (165.6° C.) a reaction mixture comprising at least one isocyanate having a functionality less than about 2.2, at least one chain polyol, at least one chain extender and at least one plasticizer, the NCO/QH ratio in the reaction system being about 0.95 to about 1.05, wherein said ingredients are present in amounts sufficient to meet the following formula:

$$\frac{A+B+C}{D} = 0.5 \text{ to about } 7.0$$

wherein A represents the equivalent weight of the long chain polyol x the moles thereof used; B represents the equivalent weight of the chain extender x the moles thereof used; C represents the equivalent weight of the isocyanate used; and D represents the grams of plasticizer, and (b) from 95–5 wt. % of a second component of a polyurethane not within the definition of the first component.

2. A composition according to claim 1 wherein the isocyanate in the first component is MDI, HMDI or an isocyanate of the formula O=C=N—(D)—N=C=O where D is an aliphatic group of from 6 to 36 carbon atoms.

3. A composition according to claim 1 wherein the long chain polyol in the first component is a polyester polyol, a polycaprolactone polyol, a polyether polyol, or a polycarbonate polyol.

4. A composition according to claim 1 wherein the chain extender of the first component is a short chain diol of from 2 to about 10 carbon atoms.

5. A composition according to claim 4 wherein the chain extender of the first component is ethylene glycol, 1,3-propanediol, 2-methyl-1,3-propanediol, 1,4-butanediol, 1,5-pentanediol, 2-methyl-1,4-butanediol, 1,6-hexanediol, and 1,10-decanediol.

6. A composition according to claim 1 wherein the plasticizer is capable of being reacted into the polyurethane at a temperature of about 330° F. (165.6° C.).

7. A composition according to claim 6 wherein the plasticizer is butyl benzyl phthalate, dibutyl phthalate, dioctyl phthalate, or dipropylene glycol dibenzoate.

8. A composition according to claim 1 wherein the first component is present in an amount of from about 15 to about 85 wt. % and the second component is present in an amount of from about 85 to about 15 wt. %, the isocyanate in the first component is MDI, HMDI or an isocyanate of the formula O=C=N—(D)—N=C=O where D is an aliphatic group of from 6 to 36 carbon atoms, the long chain polyol in the first component is a polyester polyol, a polcaprolactone polyol, a polyether polyol, or a polycarbonate polyol, the chain extender is a short chain diol of from 2 to about 10 carbon atoms, and the plasticizer is capable of being reacted into the polyurethane at a temperature of about 330° F. (165.6° C.).

9. A composition according to claim 1 wherein the first component is present in an amount of from about 20 to about 80 wt. % and the second component is present in an amount of from 80 to about 20 wt. %.

10. A composition according to claim 1 wherein the first component is present in an amount of about 30 to about 70 wt. % and the second component is present in an amount of from about 70 to about 30 wt. %.

11. A method of preparing a composition of claim 1 comprising melt compounding at least one first component according to claim 1 with at least one second component according to claim 1 at a temperature of at least about 330° F. (165.6° C.).

12. A composition according to claim 1 wherein the composition has a compression set performance of between 15 and 20, as by ASTM D395-61.

* * * * *

UNITED STATES PATENT AND TRADEMARK OFFICE
CERTIFICATE OF CORRECTION

PATENT NO. : 5,516,857
DATED : May 14, 1996
INVENTOR(S) : William H. Mann

It is certified that error appears in the above-indentified patent and that said Letters Patent is hereby corrected as shown below:

At col. 1, l. 51 after "feel" insert --,--.

At col. 2, l. 61 change "prepolymer" to --prepolymers--.

At col. 4, l. 30 omit "or".

At col. 4, l. 34 after "herein" add --and--.

At col. 6, l. 57 change "polyethers" to --polyether--.

At col. 7, l. 15 change "NCO/QH" to --NCO/OH--.

At col. 8, l. 18 change "polcaprolactone" to --polycaprolactone--.

At col. 8, l. 40 after "as" insert --determined--.

Signed and Sealed this

Tenth Day of September, 1996

Attest:

BRUCE LEHMAN

Attesting Officer

Commissioner of Patents and Trademarks